(12) United States Patent
Park et al.

(10) Patent No.: US 8,730,859 B2
(45) Date of Patent: May 20, 2014

(54) METHOD AND APPARATUS OF SLEEP MODE OPERATION

(75) Inventors: Giwon Park, Gyeonggi-Do (KR); Yongho Kim, Gyeonggi-Do (KR); Kiseon Ryu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 199 days.

(21) Appl. No.: 13/377,747

(22) PCT Filed: Jun. 25, 2010

(86) PCT No.: PCT/KR2010/004154
§ 371 (c)(1),
(2), (4) Date: Dec. 12, 2011

(87) PCT Pub. No.: WO2010/151081
PCT Pub. Date: Dec. 29, 2010

(65) Prior Publication Data
US 2012/0099502 A1    Apr. 26, 2012

Related U.S. Application Data

(60) Provisional application No. 61/220,586, filed on Jun. 26, 2009, provisional application No. 61/221,524, filed on Jun. 29, 2009, provisional application No. 61/225,556, filed on Jul. 14, 2009.

(30) Foreign Application Priority Data

Nov. 26, 2009    (KR) .................. 10-2009-0115340

(51) Int. Cl.
*G08C 17/00* (2006.01)
(52) U.S. Cl.
USPC ............ 370/311; 370/336; 370/338; 370/345

(58) Field of Classification Search
USPC ................ 370/311, 328, 329, 338, 336, 345; 455/418, 446, 528, 574
See application file for complete search history.

(56) References Cited

U.S. PATENT DOCUMENTS

| | | | |
|---|---|---|---|
| 2006/0009267 A1* | 1/2006 | Lee et al. | 455/574 |
| 2007/0218939 A1* | 9/2007 | Lim et al. | 455/528 |
| 2008/0075026 A1 | 3/2008 | Son et al. | |
| 2008/0182567 A1* | 7/2008 | Zhu et al. | 455/418 |
| 2008/0293422 A1* | 11/2008 | Kang et al. | 455/446 |
| 2010/0041445 A1* | 2/2010 | Qi et al. | 455/574 |

FOREIGN PATENT DOCUMENTS

WO    WO 2009-051458 A2    4/2009

* cited by examiner

*Primary Examiner* — Brian D Nguyen
*Assistant Examiner* — Toan Nguyen
(74) *Attorney, Agent, or Firm* — McKenna Long & Aldridge LLP

(57) ABSTRACT

Disclosed herein relates to a sleep mode operation method, and the sleep mode operation method according to the present invention may include transmitting a sleep request message for requesting sleep mode switching to a base station; receiving a sleep operating parameter including a sleep cycle and a listening window from the base station; referring to the sleep operating parameter to switch to a sleep mode; receiving a traffic indication message indicating that traffic is generated from the base station; receiving traffic from the base station during the listening window while at the same time operating a timer; and early terminating the listening window to enter into a sleep window if the timer operation is expired according to the traffic reception prior to terminating the listening window.

10 Claims, 3 Drawing Sheets

METHOD AND APPARATUS OF SLEEP MODE OPERATION

This application is a 35 U.S.C. §371 National Stage entry of International Application No. PCT/KR2010/004154, filed on Jun. 25, 2010, and claims the benefit of priority of U.S. Provisional application Nos. 61/220,586 filed Jun. 26, 2009, 61/221,524 filed Jun. 29, 2009, 61/225,556 filed Jul. 14, 2009, and Korean Patent Application No. 10-2009-0115340 filed on Nov. 26, 2009, all of which are incorporated by reference in their entirety herein.

TECHNICAL FIELD

The present invention relates to a sleep mode operation method and apparatus, and more particularly, to a method and apparatus for operating a sleep mode capable of early terminating a listening window in the sleep mode, thereby enhancing the effect of power reduction in a terminal.

BACKGROUND ART

The problem of power consumption in terminals may be a considerably important element in a broadband wireless mobile communication system compared to other systems because the mobility of terminals should be considered. A sleep mode operation between a terminal and a base station has been proposed as one of such methods for minimizing power consumption in the terminal.

In a conventional sleep mode operation, a terminal requests to enter into a sleep mode if there exists no more traffic to be transmitted and/or received to and/or from a base station while performing a communication with the base station in an active mode, and receives a response to that request from the base station to change the state thereof to a sleep mode.

The terminal that has entered into a sleep state receives a message indicating whether there exists a traffic transferred from the base station during a sleep listening window, and determines that there exists no data traffic transmitted to a downlink, and increases the current sleep cycle twice if negative indication indicating that there exists no traffic is received.

Furthermore, if positive indication is received from the base station during the listening window, then the terminal determines that there exists data traffic transferred to a downlink, and initializes the current sleep cycle.

However, the power level of the terminal is increased during the set window even though there exist no protocol data unit (PDU) transferred to from the base station to the terminal during a listening window of the sleep mode, thereby causing unnecessary power consumption.

DISCLOSURE OF INVENTION

Solution to Problem

An object of the present invention is to provide a method and apparatus capable of early terminating a listening window to reduce power consumption that is used during the listening window of a terminal being operated in a sleep mode.

In addition, another object of the present invention is to provide a method and apparatus capable of effectively terminating a listening window through the timer operation of the terminal in case where new packet data is received from the base station during the listening window of a terminal being operated in a sleep mode.

In order to accomplish the foregoing object, a sleep mode operation method according to an embodiment of the present invention may include transmitting a sleep request message for requesting sleep mode switching to a base station; receiving a sleep operating parameter including a sleep cycle and a listening window from the base station; switching to a sleep mode by referring to the sleep operating parameter; receiving a traffic indication message indicating that traffic is generated from the base station; operating a timer at a time when traffic is received from the base station during the listening window; and early terminating the listening window to enter into a sleep window if the timer operation is expired according to the traffic reception prior to terminating the listening window.

In order to accomplish the foregoing object, a sleep mode operation method according to another embodiment of the present invention may include transferring a sleep request message for requesting sleep mode switching to a base station; receiving a sleep operating parameter including a sleep cycle and a listening window from the base station; switching to a sleep mode by referring to the sleep operating parameter; receiving a traffic indication message indicating that traffic is generated from the base station; extending the listening window to receive traffic from the base station, and receiving traffic from the base station during the extended listening window while at the same time operating a timer; and early terminating the listening window to enter into a sleep window if the timer operation is expired according to the traffic reception prior to terminating the extended listening window.

In order to accomplish the foregoing object, a sleep mode operation method according to still another embodiment of the present invention may include transferring a sleep request message for requesting sleep mode switching to a base station; receiving a sleep operating parameter including a sleep cycle and a listening window from the base station; switching to a sleep mode by referring to the sleep operating parameter; receiving a traffic indication message indicating that traffic is generated from the base station; operating a timer at a time when traffic is received from the base station during the listening window; receiving an early listening window termination indication (ELWTI) message from the base station during the listening window; and early terminating the listening window to enter into a sleep window.

In order to accomplish the foregoing object, a sleep mode operation method according to yet still another embodiment of the present invention may include transferring a sleep request message for requesting sleep mode switching to a base station; receiving a sleep operating parameter including a sleep cycle and a listening window from the base station; switching to a sleep mode by referring to the sleep operating parameter; receiving a traffic indication message indicating that traffic is generated from the base station; extending the listening window to receive traffic from the base station, and receiving traffic from the base station during the extended listening window while at the same time operating a timer; receiving an early listening window termination indication (ELWTI) message from the base station during the extended listening window; and early terminating the listening window to enter into a sleep window.

In order to accomplish the foregoing object, a sleep mode operation apparatus according to an embodiment of the present invention is characterized by including a transmitter configured to transmit a sleep request message for requesting sleep mode switching to a base station; a receiver configured to receive a sleep operating parameter including a sleep cycle and a listening window from the base station; a controller configured to refer to the sleep operating parameter to control a sleep mode operation; and a timer configured to check a predetermined setting time according to a control signal of the controller if traffic is received from the base station through the receiver during the listening window, wherein the controller receives traffic from the base station during the listening window while at the same time operating a timer, and controls to early terminate the listening window to enter into a sleep window if the timer operation is expired according to the traffic reception prior to terminating the listening window or an early listening window termination indication message is received from the base station.

According to the present invention, in case where there exists no data to be transferred from a base station to a terminal or data reception is completed during the listening window of a terminal being operated in a sleep mode, the listening window of the current sleep mode is early terminated through an early listening window termination indication of the base station, thereby having the effect of reducing power consumption of a terminal.

In addition, even in case where new packet data is received from the base station during the listening window of a terminal being operated in a sleep mode, having the effect of effectively terminating a listening window through the timer operation of the terminal.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
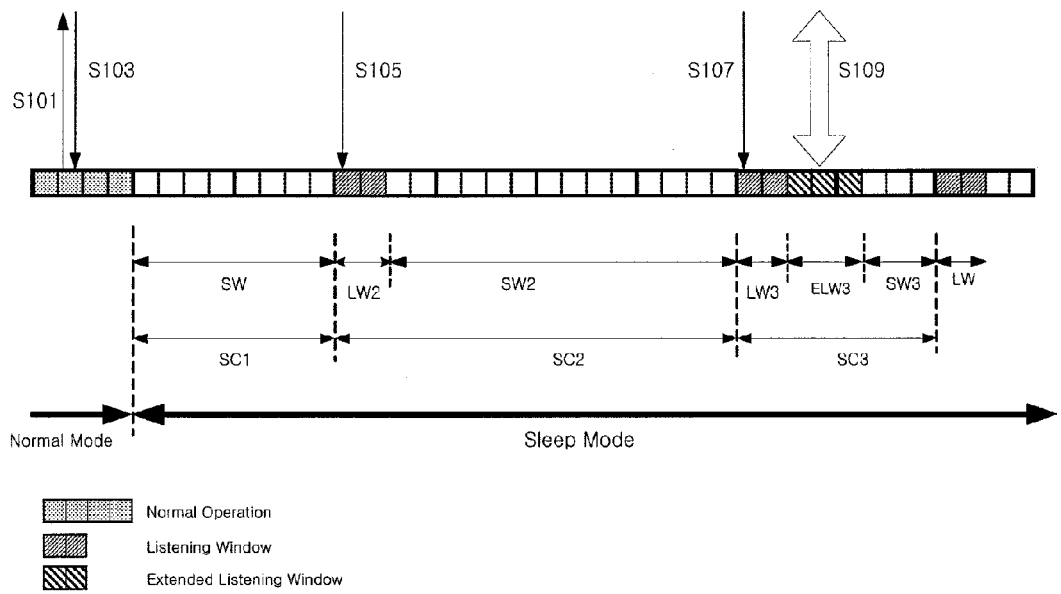
FIG. 1 is a view schematically illustrating a sleep mode operation.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Hereinafter, the term "terminal" herein is used with a meaning, commonly referred to as a user equipment (UE), a mobile equipment (ME), and a mobile station (MS). Furthermore, the terminal may be portable equipment such as a portable phone, a PDA, a smart phone, and a notebook, or non-portable equipment such as a PC, and a vehicle-loaded device.

FIG. 1 is a view schematically illustrating a sleep mode operation.

A terminal transmits a SLP-REQ message for requesting to switch to a sleep mode to the base station if there exists no more traffic to be transmitted or received in a normal state (S101), and receives a SLP-RSP message including a sleep parameter such as sleep cycle, listening window, and the like from the base station (S103) and the state thereof is switched to a sleep mode.

The sleep mode may include a sleep window (SW) incapable of receiving data and a listening window (LW) capable of receiving data.

The terminal applies operate a sleep mode by applying a sleep cycle (SC1) including only a sleep window (SW1) when changing the state to an initial sleep mode. From a second sleep cycle subsequent to terminating the first sleep cycle (SC1), the terminal operates the sleep mode by applying a sleep cycle (SC2) including a listening window (LW2) and a sleep window (SW2).

In the second sleep cycle (SC2), if a TRF-IND message including negative indication is received from the base station during the listening window (LW2) (S105), then the terminal determines that there exists no traffic transmitted to a downlink, thereby increasing the current sleep cycle twice.

Subsequent to terminating the sleep cycle (SC2) increased twice, if a TRF-IND message including positive indication is received during a listening window (LW3) of the following sleep cycle (SC3) (S107), then the terminal extends the listening window (ELW3) to receive the generated data traffic and then receives data traffic from the base station (S109), and enters into a sleep window (SW3) again to perform a sleep mode operation. At this time, the sleep cycle (SC3) includes a listening window (SW3), an extended listening window (LW3), and a sleep window (SW3) as illustrated in the drawing, and then the sleep cycle (SC3) is reset to an initial sleep cycle (SC1).

Hereinafter, a method capable of early terminating a listening window and an early listening window termination indication message will be described.

I. Indication Message for Early Listening Window Termination

The base station can transmit PDUs to the terminal during a listening window of the terminal sleep mode, and sends an indication to terminate the listening window to the terminal if the transmitted PDU is the last PDU.

In case of where an indication to terminate the listening window is received from the base station, the terminal may early terminate the listening window even though the current listening window is not finished to enter into a sleep window, thereby reducing power consumption of the terminal.

In the present invention, indication the information "early listening window termination flag" is defined for the terminal to early terminate the listening window.

Hereinafter, the early listening window termination flag is referred to as "ELWTF".

The terminal notifies whether the function capable of early terminating a listening window is supported by the terminal through a SLP-REQ message transmitted to the base station when requesting an initial sleep mode entry.

The structure of a SLP-REQ message is schematically illustrated in the following Table 1, wherein the terminal may notify whether the early listening window termination function is supported through an ELWTF field to the base station.

TABLE 1

| Syntax | Size (bit) | Notes |
|---|---|---|
| AAI_SLP-REQ ( ) { | | |
| Request_Code | 2 | 0b00: Exit from Sleep Mode |
| | | 0b01: Enter Sleep Mode |
| | | 0b10: Change Sleep Mode |
| | | 0b11: Reserved |
| Sleep_Cycle_ID (SCID) | 4 | |
| if(Request_Code == 0b01 ‖ 0b10) { | | |
| Listening window Extension Flag (LWEF) | 1 | If LWEF = 0, indicates that the Listening window is of fixed duration. |
| | | If LWEF = 1, indicates that the Listening window can be extended and is of variable duration |
| | | In case of TIMF = 1, LWEF shall be set to 1 |
| Early Listening Window Termination Flag (ELWTF) | 1 | If ELWTF = 0, indicates that early listening window termination is not supported. |
| | | If ELWTF = 1, indicates that early listening window termination is supported |
| Start Frame Number | 6 | Start frame number for first sleep window |
| Initial Sleep Cycle | 8 | |
| Final Sleep Cycle | 10 | |
| Listening Window | 6 | |
| if(LWEF == 1) { | | |
| T_AMS | 8 | Measured in Frames |
| T_HARQ_Retx | 8 | Measured in Frames |
| } | | |
| Padding | variable | Padding bits to ensure byte aligned. |
| } | | |
| } | | |

Through the SLP-REQ message as illustrated in Table 1, the terminal may request a sleep mode entry (Request_Code=0b00), a sleep mode change (Request_Code=0b01), and the like, to the base station.

In case of requesting the sleep mode entry or change, the terminal may notify whether the listening window configured in the terminal can be early terminated through an ELWTF field.

In other words, the terminal may not support early listening window termination if ELWTF=0, but terminal may early terminate a listening window during the sleep mode operation of the terminal through an early listening window termination indication of the base station or the timer operation of a terminal if ELWTF=1.

Similarly, the base station may also notify in advance whether the base station can indicate to early terminate the listening window through a response message (SLP-RSP) to the SLP-REQ message of the terminal.

The structure of a SLP-RSP message is schematically illustrated in the following Table 2, wherein the base station may notify whether the early listening window termination function is supported through an ELWTF field to the terminal.

TABLE 2

| Syntax | Size (bit) | Notes |
|---|---|---|
| AAI_SLP-RSP ( ) { | | |
| Response_Code | 2 | 0b00: Request by ABS in Unsolicited Manner |
| | | 0b01: Approval of AAI_SLP-REQ |
| | | 0b10: Rejection of AAI_SLP-REQ |
| | | 0b11: Reserved |
| if(Response_Code == 0b00 ‖ 0b01) { | | |
| Operation | 2 | 0b00: Exit Sleep Mode |
| | | 0b01: Enter Sleep Mode |
| | | 0b10: Change Sleep Mode |
| | | 0b11: Reserved |
| Sleep_Cycle_ID (SCID) | 4 | |
| if(Operation == 0b01 ‖ 0b10) { | | |
| Listening window Extension Flag (LWEF) | 1 | If LWEF = 0, indicates that the Listening window is of fixed duration. |
| | | If LWEF = 1, indicates that the Listening window can be extended and is of variable duration |
| | | In case of TIMF = 1, LWEF shall be set to 1 |
| Early Listening Window Termination Flag (ELWTF) | 1 | If ELWTF = 0, indicates that early listening window termination is not supported. |
| | | If ELWTF = 1, indicates that early listening window termination is supported |
| Start_Frame_Number | 6 | Start frame number for first sleep window |
| Initial Sleep Cycle | 8 | |
| Final Sleep Cycle | 10 | |
| Listening Window | 6 | |
| if(TIMF == 1) { | | |

TABLE 2-continued

| Syntax | Size (bit) | Notes |
|---|---|---|
| SLPID | 10 | |
| Reserved | 2 | |
| } | | |
| if(LWEF == 1) { | | |
| T_AMS | 8 | Measured in Frames |
| T_HARQ_Retx | 8 | Measured in Frames |
| } | | |
| Padding | variable | Padding bits to ensure byte aligned. |
| } | | |
| else if(Response_Code == 0b10) { | | |
| REQ_duration | 8 | Least Significant 8 bits of Frame Number |
| Reserved | 4 | |
| } | | |
| } | | |

Through a SLP-RSP message as illustrated in Table 2, the base station may approve (Response_Code=0b01) or reject (Response_Code=0b10) a sleep mode entry request of the terminal, and according to circumstances, the base station may transmit an unsolicited SLP-RSP message to the terminal even without the sleep mode entry request of the terminal, thereby indicating to enter into a sleep mode (Response_Code=0b00).

In case where the sleep mode entry request of the terminal is approved, the base station may notify whether the listening window configured in the terminal can be indicated to be early terminated through an ELWTF field.

In other words, the base station cannot indicate early listening window termination of the terminal if ELWTF=0, but base station can indicate to early terminate a listening window during the sleep mode operation of the terminal through an early listening window termination indication if ELWTF=1.

As described above, the base station and terminal may define an ELWTF information field indicating the early sleep mode listening window termination of the terminal through a SLP-REQ/RSP message, and negotiate in advance whether the early listening window termination is indicated or supported in the base station and terminal.

Furthermore, in case where PDU to be transmitted to the listening window of a terminal being operated in a sleep mode is the last PDU, the base station may indicate whether the listening window will be early terminated based on the ELWTF.

II. First Embodiment

ELWTF=0

In case where ELWTF is set to "0" in Tables 1 and 2, the base station does not transfer an early listening window termination indication to the terminal if PDU in the buffer is the last PDU to be transmitted to the terminal during the listening window or listening window extension.

In this case, the terminal may receive PDU from the base station to operate a timer (TMS), and early terminate the listening window if TMS is expired and enter into a sleep window.

Figure 2:
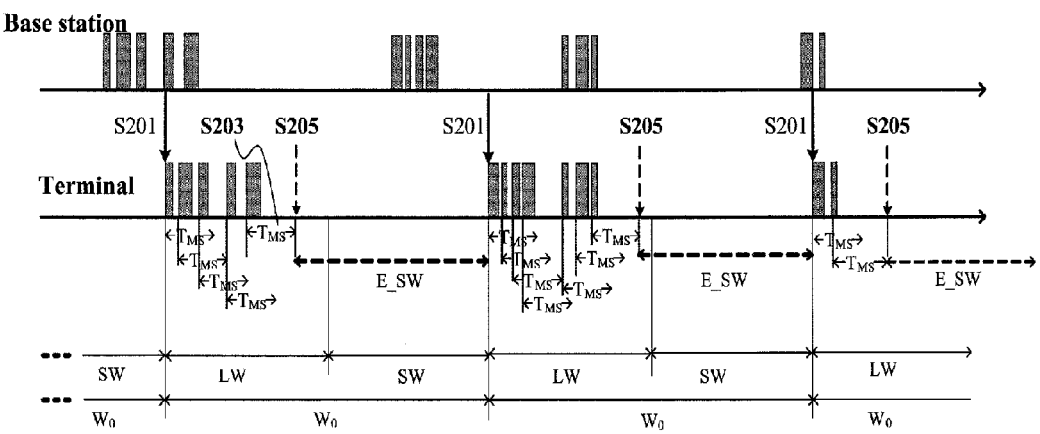
FIG. 2 is a view illustrating an early listening window termination operation of a terminal according to an embodiment of the present invention if ELWTF is set to "0"

FIG. 2 is a view illustrating an early listening window termination operation of a terminal according to an embodiment of the present invention if ELWTF is set to "0".

In case where there exists a packet to be transmitted to the terminal, the base station transmits a positive TRF-IND message to the listening window (S201) to notify the terminal that traffic has been generated, and transmits a packet to the terminal, thereby operating an inactivity timer ($T_{BS}$) of the base station.

In case where the PDU is received from the base station to the listening window, the terminal operates the timer ($T_{MS}$) of the terminal (S203).

The timers $T_{MS}$ and $T_{BS}$ are started at the timing when the listening window is started to get positive indication and receive a packet, or started in case where a packet is assigned in the listening window.

If a new packet is assigned therein while $T_{MS}$ and $T_{BS}$ are maintained at the terminal base station, respectively, then the previous $T_{MS}$ and $T_{BS}$ are terminated to start new $T_{MS}/T_{BS}$.

At this time, the terminal typically does not terminate the listening window excluding a case of an indication to terminate the listening window is received from the base station even though the timer is expired. Accordingly, the sleep window (SW) of the terminal is started subsequent to terminating the listening window (LW), as illustrated in the following description even though the timer is expired.

In this embodiment, the terminal terminates the listening window in advance even though the listening window is not expired if the timer T_MS is expired to more enhance the power saving effect of the terminal.

As illustrated in the drawing, the terminal operates the timer TMS if PDU is received from the base station, and terminates the listening window in advance to switch the state to a sleep window if the timer $T_{MS}$ is expired (S205).

As a result, it is seen that the sleep window of the terminal is increased as shown in E-SW to enhance the power saving effect of the terminal.

Figure 3:
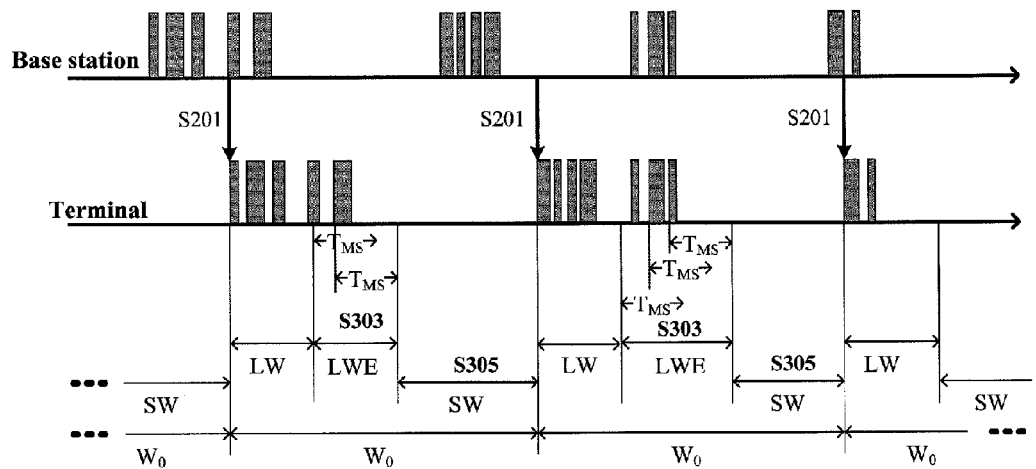
FIG. 3 is a view illustrating an early listening window termination operation of a terminal according to another embodiment of the present invention if ELWTF is set to "0"

FIG. 3 is a view illustrating an early listening window termination operation of a terminal according to another embodiment of the present invention if ELWTF is set to "0".

In the embodiment of FIG. 3, the timer $T_{MS}$ is applied only in case where the listening window is extended. Furthermore, in case where the listening window is extended, $T_{MS}$ is basically started and the terminal restarts the timer $T_{MS}$ in case where new PDU or packet is transferred (S303).

As illustrated in FIG. 3, in case where a packet transmitted from the base station to the terminal during the ELW window is the last packet, the terminal receives the relevant packet to restart the timer $T_{MS}$. In case where a new packet is not received until the timer is completed, the terminal terminates the listening window and enters into a sleep window (S305).

Figure 4:
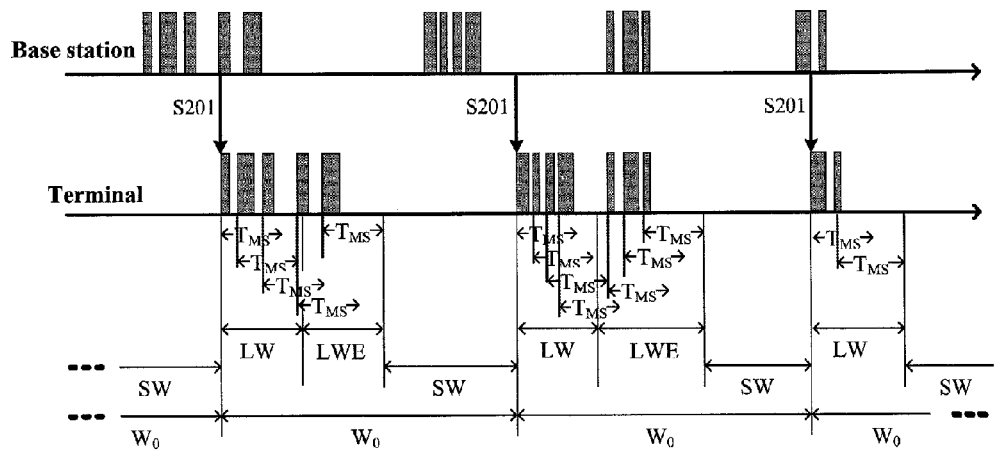
FIG. 4 is a view illustrating an early listening window termination operation of a terminal according to still another embodiment of the present invention if ELWTF is set to "0"

FIG. 4 is a view illustrating an early listening window termination operation of a terminal according to still another embodiment of the present invention if ELWTF is set to "0";

In this embodiment, the timer $T_{MS}$ is used in both the listening window and listening window extension.

As illustrated in FIG. 4, if a new packet is received by the terminal in the listening window (LW) and the listening window extension (LWE), then the timer TMS is restarted in each of the windows, respectively.

Since the ELWTF field is set to "0", the base station does not transfer an early listening window termination indication to the terminal even though a packet transmitted from the base station to the terminal is the last packet during the windows LW and ELW. As a result, the terminal receives the relevant packet to restart the timer TMS, and terminates the listening window and enters into a sleep window if a new packet is not received until the timer is completed.

II. Third Embodiment

ELWTF=1

In case where ELWTF is set to "1" in Tables 1 and 2, the base station transfers an early listening window termination indication to the terminal if PDU in the buffer is the last PDU to be transmitted to the terminal during the listening window or listening window extension.

Figure 5:
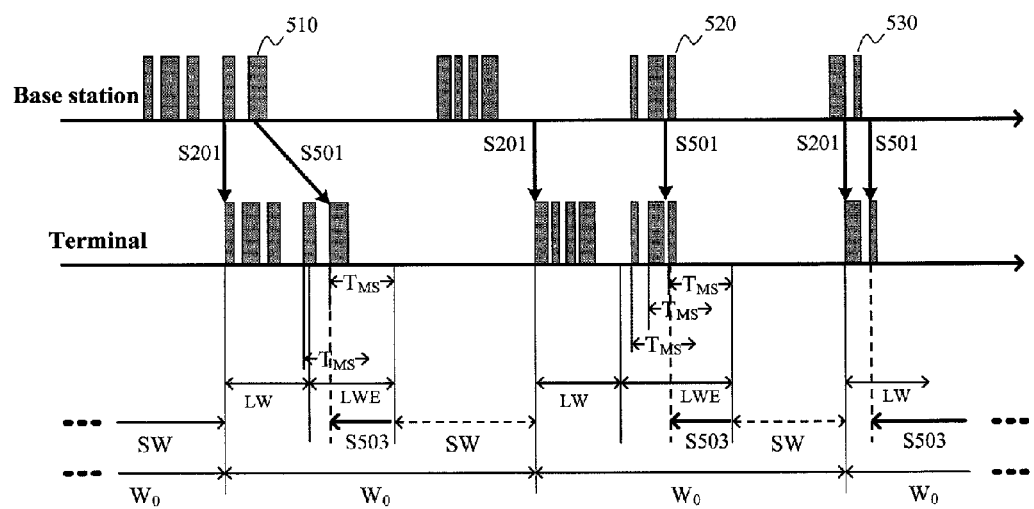
FIG. 5 is a view illustrating an early listening window termination operation of a terminal according to an embodiment of the present invention if ELWTF is set to "1"

FIG. 5 is a view illustrating an early listening window termination operation of a terminal according to an embodiment of the present invention if ELWTF is set to "1".

As illustrated in the drawing, according to this embodiment, the timer $T_{MS}$ is applied only in case where the listening window is extended. Furthermore, in case where the listening window is extended, the timer $T_{MS}$ is basically started and the terminal restarts the timer $T_{MS}$ in case where new PDU or packet is transferred from the base station.

In case where a packet transmitted from the base station to the terminal is the last packet 510, 520, 530 in the window LW or LWE, the base station transfers an early listening window termination indication (ELWTI), which is an indication to terminate the listening window, to the terminal (S501).

The terminal terminates the listening window immediately when receiving ELWTI and enters into a sleep window (S503).

Figure 6:
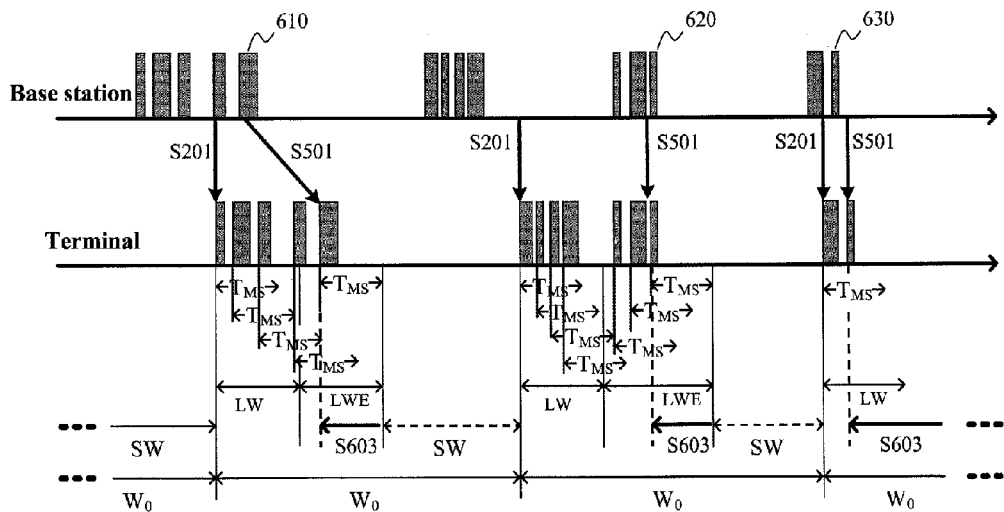
FIG. 6 is a view illustrating an early listening window termination operation of a terminal according to another embodiment of the present invention if ELWTF is set to "1"

FIG. 6 is a view illustrating an early listening window termination operation of a terminal according to another embodiment of the present invention if ELWTF is set to "1".

In the previous embodiment of FIG. 5, The timer $T_{MS}$ is used only in the window LWE, but it is used in both the windows LW and LWE in this embodiment.

As illustrated in the drawing, if a new packet is received from the base station in the windows LW and LWE, then the timer $T_{MS}$ is restarted.

As described above, in case where the ELWTF field is set to "1" and negotiated, the base station transfers an early listening window termination indication (ELWTI), which is an indication to terminate the listening window, to the terminal (S601). The terminal terminates the listening window immediately when receiving ELWTI from the base station and enters into a sleep window (S603).

The early listening window termination indication (EL-WTI), which is an indication to terminate the listening window transmitted from the base station to the terminal, may be transferred through a downlink (DL) sleep control extended header as illustrated in the following Table 3.

TABLE 3

| Syntax | Size (bit) | Notes |
|---|---|---|
| Listening window termination flag | 1 | If the relevant flag is set, then the terminal received this flag terminates the listening window. |

Figure 7:
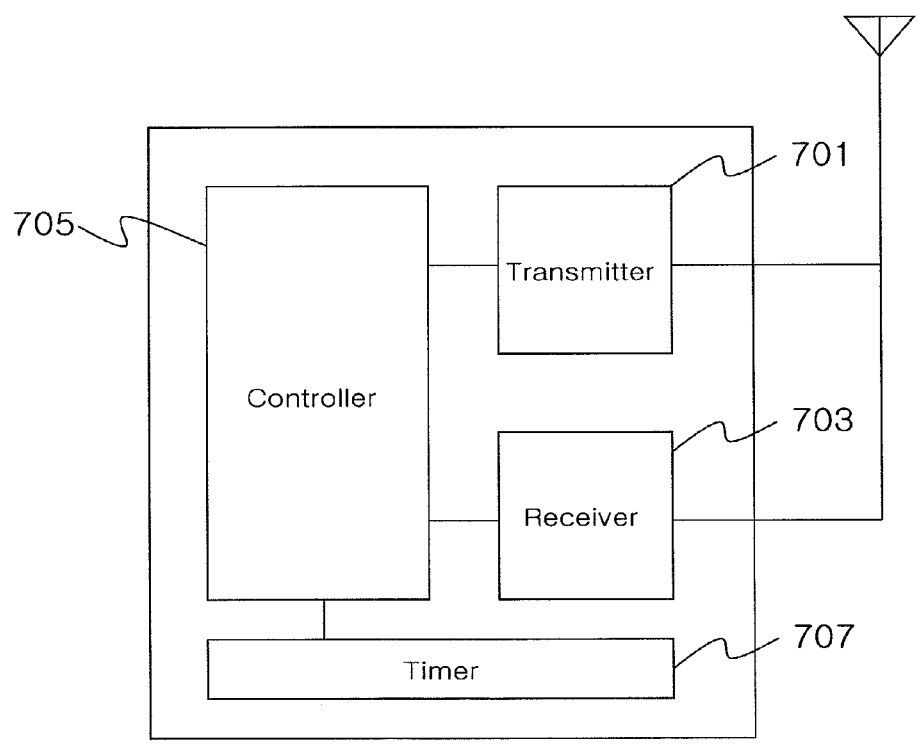
FIG. 7 is a block diagram schematically illustrating a sleep mode operation apparatus according to an embodiment of the present invention.

FIG. 7 is a block diagram schematically illustrating a sleep mode operation apparatus according to an embodiment of the present invention.

The terminal may include a transmitter 701 configured to transmit a sleep request message for requesting sleep mode switching to a base station, a receiver 703 configured to receive a sleep operating parameter including a sleep cycle and a listening window from the base station, a controller 705 configured to refer to the sleep operating parameter to control a sleep mode operation, and a timer 707 configured to check a predetermined setting time according to a control signal of the controller if traffic is received from the base station through the receiver during the listening window.

The controller 705 receives traffic from the base station during the listening window while at the same time operating a timer, and controls to early terminate the listening window to enter into a sleep window if the operation of the timer 707 is expired according to the traffic reception prior to terminating the listening window or an early listening window termination indication message (ELWTI) is received from the base station.

The method according to the present invention as described above may be implemented by software, hardware, or a combination of both. For example, the method according to the present invention may be stored in a storage medium (for example, internal memory, flash memory, hard disk, and so on), and may be implemented through codes or instructions in a software program that can be performed by a processor (for example, internal microprocessor).

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims.

The invention claimed is:

1. A sleep mode operation method in a terminal, the method comprising:
    transmitting a sleep request message for requesting sleep mode switching to a base station;
    receiving a sleep operating parameter including a sleep cycle and a listening window from the base station;
    switching to a sleep mode by referring to the sleep operating parameter;
    receiving a traffic indication message indicating that traffic is generated from the base station;
    starting a timer after receiving traffic from the base station during the listening window; and
    early terminating the listening window to enter into a sleep window before the listening window ends if the timer expires without receiving traffic from the base station during the listening window.

2. The method of claim 1, wherein the sleep request message includes an early listening window termination flag (EL-WTF) indicating whether early listening window termination operation is supported by the terminal, and
    the sleep operating parameter further includes bit information indicating whether the base station indicating to early terminate the listening window of the terminal is enabled.

3. The method of claim 2, wherein when the bit information is set to "0", indication that the base station early terminates to the terminal the listening window is deactivated.

4. The method of claim 1, wherein the listening window is extended according to the traffic generated from the base station.

5. A sleep mode operation method in a terminal, the method comprising:
    transferring a sleep request message for requesting sleep mode switching to a base station;
    receiving a sleep operating parameter including a sleep cycle and a listening window from the base station;
    switching to a sleep mode by referring to the sleep operating parameter;

receiving a traffic indication message indicating that traffic is generated from the base station;

starting a timer after receiving traffic from the base station during the listening window;

receiving an early listening window termination indication (ELWTI) message from the base station during the listening window, the ELWTI message indicating to early terminate the listening window before the listening window ends; and early terminating the listening window before the listening window ends to enter into a sleep window after receiving the ELWTI message.

6. The method of claim 5, wherein the sleep request message comprises an early listening window termination flag (ELWTF) indicating whether early listening window termination operation is supported by the terminal, and the sleep operating parameter further comprises bit information indicating whether early listening window termination indication (ELWTI) of the terminal is enabled by the base station.

7. The method of claim 5, wherein the early listening window termination indication (ELWTI) received during the listening window is received through a downlink (DL) sleep control extended header.

8. The method of claim 5, wherein the listening window is extended according to the traffic generated from the base station.

9. A sleep mode operation apparatus, the apparatus configured to:

transmit a sleep request message for requesting sleep mode switching to a base station;

receive a sleep operating parameter including a sleep cycle and a listening window from the base station;

switch to a sleep mode by referring to the sleep operating parameter;

receive a traffic indication message indicating that traffic is generated from the base station;

start a timer after receiving traffic from the base station during the listening window; and early terminate the listening window to enter into a sleep window before the listening window ends if the timer expires without receiving traffic from the base station during the listening window.

10. A sleep mode operation apparatus, the apparatus configured to:

transfer a sleep request message for requesting sleep mode switching to a base station;

receive a sleep operating parameter including a sleep cycle and a listening window from the base station;

switch to a sleep mode by referring to the sleep operating parameter;

receive a traffic indication message indicating that traffic is generated from the base station;

start a timer after receiving traffic from the base station during the listening window;

receive an early listening window termination indication (ELWTI) message from the base station during the listening window, the ELWTI message indicating to early terminate the listening window before the listening window ends; and early terminate the listening window before the listening window ends to enter into a sleep window after receiving the ELWTI message.

\* \* \* \* \*